(12) United States Patent
Shimanaka et al.

(10) Patent No.: US 7,985,796 B2
(45) Date of Patent: Jul. 26, 2011

(54) COPOLYMER AND USE THEREOF

(75) Inventors: Hiroyuki Shimanaka, Chuo-ku (JP); Yoshikazu Murakami, Chuo-ku (JP); Naoyuki Sakai, Chuo-ku (JP); Shinya Tsuchida, Chuo-ku (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 204 days.

(21) Appl. No.: 12/449,653

(22) PCT Filed: Feb. 20, 2008

(86) PCT No.: PCT/JP2008/052795
§ 371 (c)(1), (2), (4) Date: Aug. 19, 2009

(87) PCT Pub. No.: WO2008/108167
PCT Pub. Date: Sep. 12, 2008

(65) Prior Publication Data
US 2010/0120974 A1     May 13, 2010

(30) Foreign Application Priority Data
Mar. 6, 2007 (JP) .................. 2007-055302

(51) Int. Cl.
*C08L 31/00* (2006.01)
*C08F 220/68* (2006.01)
(52) U.S. Cl. .................. 524/559; 526/318; 526/319
(58) Field of Classification Search .................. 524/559; 526/318, 319
See application file for complete search history.

(56) References Cited

U.S. PATENT DOCUMENTS

| | | | |
|---|---|---|---|
| 5,399,294 A | 3/1995 | Quednau | |
| 5,693,717 A * | 12/1997 | Pfirmann et al. | 525/296 |
| 6,465,595 B1 | 10/2002 | Takizawa et al. | |
| 6,710,127 B2 * | 3/2004 | Haubennestel et al. | 525/64 |
| 2002/0143087 A1 | 10/2002 | Haubennestel et al. | |
| 2004/0171732 A1 | 9/2004 | Matsuzaki et al. | |
| 2007/0287769 A1 | 12/2007 | Nishiwaki et al. | |

FOREIGN PATENT DOCUMENTS

| | | |
|---|---|---|
| DE | 195 24 053 A1 | 1/1997 |
| EP | 0 311 157 A1 | 4/1989 |
| EP | 0 464 454 A2 | 1/1992 |
| EP | 1 167 478 A1 | 1/2002 |
| EP | 1 193 299 A2 | 4/2002 |
| EP | 1 555 274 A1 | 7/2005 |
| JP | 55-035321 A | 3/1980 |
| JP | 1-164429 A | 6/1989 |
| JP | 2-501486 A | 5/1990 |
| JP | 4-053802 A | 2/1992 |
| JP | 4-210220 A | 7/1992 |
| JP | 11-197485 A | 7/1999 |
| JP | 2002-194037 A | 7/2002 |
| JP | 2004-018598 A | 1/2004 |
| JP | 2007-332179 A | 12/2007 |
| JP | 2008-056786 A | 3/2008 |
| KR | 10-0404482 B1 | 11/2003 |
| WO | WO 88/04304 A1 | 6/1988 |

OTHER PUBLICATIONS

European Patent Office, Supplementary European Search Report for European Patent Application No. EP 08 72 0760, Jul. 20, 2010, European Patent Office, Munich, Germany.

* cited by examiner

*Primary Examiner* — Michael M Bernshteyn
(74) *Attorney, Agent, or Firm* — Chapman and Cutler LLP

(57) ABSTRACT

This invention relates a copolymer (D) containing (A) methacrylic polymer units each having, at an end thereof, at least one group represented by the below-described formula (1) and (B) units of an aromatic vinyl monomer, wherein a weight ratio (A:B) of the units (A) to the units (B) is A:B=5 to 95:95 to 5; and its use. The present invention can provide inter alia a copolymer useful as a pigment dispersant or the like capable of affording pigment dispersions useful for inkjet inks, colors for color filters, and other applications.

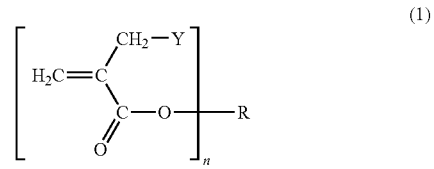

(1)

11 Claims, No Drawings

COPOLYMER AND USE THEREOF

TECHNICAL FIELD

This invention relates to a novel copolymer, its use and the like, and more specifically, to a copolymer useful as a pigment dispersant or the like, use of the copolymer as a pigment dispersant, a pigment dispersion and its use, and the like.

BACKGROUND ART

A wide variety of pigment dispersants and resin dispersions has been developed to date for various use, and their applications range across extremely diverse products. Concerning pigment dispersants, for example, known products include those of the comb structure each obtainable by reacting a polyester of a carboxylic acid, which has a single terminal COOH group, with a polyamine (Patent Document 1); those each obtainable by reacting a solvent-soluble polymer and a compound having one or more functional groups as pigment-adsorbing groups with an isocyanate (Patent Document 2); and those each obtainable by subjecting styrene and an acrylic monomer to random copolymerization (Patent Document 3).

As resin dispersions, on the other hand, there are water-based resin dispersions each obtainable by neutralizing an acrylic or acrylic styrene resin of low molecular weight to dissolve it in water, adding a monomer to the resulting system and then polymerizing them (Patent Document 4); and non-aqueous resin dispersions each obtainable by adding, in the presence of a macromonomer obtained by reacting glycidyl methacrylate, another radical polymerizable monomer to a methacrylate polymer containing at an end thereof a residual carboxyl group of a chain transfer agent such as mercaptoethylcarboxylic acid and having a long-chain hydrocarbon group of eight carbon atoms or a like number of carbon atoms soluble in an aliphatic hydrocarbon solvent (Patent Document 5).

Patent Document 1: JP-A-11-197485
Patent Document 2: JP-A-04-210220
Patent Document 3: JP-A-01-164429
Patent Document 4: JP-A-04-053802
Patent Document 5: JP-A-55-035321

DISCLOSURE OF THE INVENTION

Problem to Be Solved by the Invention

Recently, active developments have been being pursued on nanoscale pigment dispersions of high physical properties with respect to various products containing color materials, especially inkjet (IJ) inks and colors for color filters (CF) in the IT industry, and by various color material manufacturers, developments of products are also under way to meet demands for such pigment dispersions. In particular, high physical properties are required, including nanoparticulation of pigments and dispersions containing such pigment nanoparticles at high stability, that is, high pigment dispersibility, and also, for example, high chromogenicity, high gloss and the like for IJ inks, and high contrast, high transparency, high heat resistance and the like for CF colors.

An object of the present invention is, therefore, to provide a copolymer useful as a pigment dispersant or the like capable of providing pigment dispersions useful in IJ inks, CF colors and other applications.

Means for Solving the Problem

The above-described object can be achieved by the present invention to be described hereinafter. Specifically, the present invention provides a copolymer (D) (which may hereinafter be simply called "the copolymer D") comprising (A) methacrylic polymer units (which may hereinafter be simply called "units A") each having, at an end thereof, at least one group represented by the below-described formula (1) and (B) units of an aromatic vinyl monomer (which may hereinafter be simply called "units B"), wherein a weight ratio (A:B) of the units A to the units B is A:B=5 to 95:95 to 5.

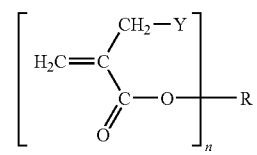

Formula (1)

wherein R represents a hydrogen atom or an n-valent ester residual group, n stands for a number of from 1 to 4, and Y represents a methacrylic polymer.

The copolymer D according to the present invention can further comprise (C) units of a monomer (which may hereinafter be simply called "units C") other than the units (A) or the units (B). The units A may preferably comprise a copolymer of a compound represented by the below-described formula (2) and a methacrylic monomer.

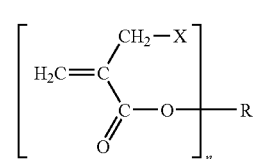

Formula (2)

wherein X represents a halogen atom, alkylthio group, arylthio group, alkylsulfoxide group, arylsulfoxide group, benzyloxy group or alkylbenzyloxy group, R represents a hydrogen atom or an n-valent ester residual group, and n stands for a number of from 1 to 4.

In the copolymer according to the present invention, the monomer forming the units B may preferably be at least one of styrene, α-methylstyrene, vinyltoluene, vinyldimethylbenzene, vinylethylbenzene, and vinylnaphthalene; and the monomer forming the units C may preferably be a monomer having a group selected from the group consisting of a carboxyl group, a hydroxyl group, a sulfonic group, a phosphoric group, an amino group, a quaternary ammonium group, and nitrogen-containing heterocyclic groups.

The units A in the copolymer D according to the present invention may each preferably contain acid groups neutralizable with an alkaline substance, and may each preferably have an acid value of from 50 to 300 mgKOH/g; the copolymer D may preferably be dispersed or emulsified in a liquid medium; and the acid groups may preferably be carboxyl groups, sulfonic groups and/or phosphoric groups.

The present invention also provides a pigment dispersant comprising the copolymer D according to the present invention; a pigment dispersion comprising a pigment dispersed by the above-described pigment dispersant; and a paint, ink, coating formulation or toner comprising the above-described pigment dispersion as a colorant.

ADVANTAGEOUS EFFECTS OF THE INVENTION

With a view to solving the above-described problem, the present inventors have pursued developments of novel pigment dispersants and resin dispersions capable of imparting high pigment dispersibility and high physical properties. As a result, the present invention has developed pigment dispersants and resin dispersions, which are polymers having novel structures and good performance over such conventional pigment dispersants and resin dispersions as described above. These copolymers are equipped with very good pigment dispersibility as pigment dispersants, and can provide microdispersions of pigments.

When the above-described pigment dispersion is used for various applications, the resulting articles can show improved performance, for example, high adhesion, high chromogenicity, high gloss, high heat resistance, and so on. Further, the copolymer according to the present invention, even when formulated into a resin dispersion, not only has storage stability but also remains stable without precipitation even when another solvent is mixed; and, when employed as a film-forming component, can afford a film having excellent physical properties such as high adhesion and high gloss.

BEST MODES FOR CARRYING OUT THE INVENTION

The present invention will next be described in further detail based on best modes for carrying out the invention. The copolymer D of the present invention comprises the units A, each of which has at an end thereof at least one group represented by the below-described formula (1), and the units B, and the weight ratio (A:B) of the units A to the units B is A:B=5 to 95:95 to 5.

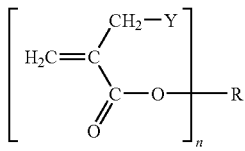

Formula (1)

wherein R represents a hydrogen atom or an n-valent ester residual group, n stands for a number of from 1 to 4, and Y represents a methacrylic polymer.

The units A in the copolymer D may each preferably comprise a copolymer of a compound represented by the below-described formula (2) and a methacrylic monomer.

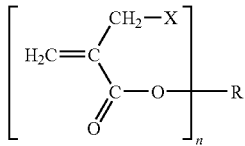

Formula (2)

wherein X represents a halogen atom, alkylthio group, arylthio group, alkylsulfoxide group, arylsulfoxide group, benzyloxy group or alkylbenzyloxy group, R represents a hydrogen atom or an n-valent ester residual group, and n stands for a number of from 1 to 4.

It is a conventionally-known process to subject, in the presence of the compound of the formula (2), another monomer to radical polymerization. This process is known as "addition-fragmentation chain transfer polymerization" (Reference document: KOBUNSHI RONBUNSHU [Japanese Journal of Polymer Science and Technology, written in Japanese), 54(10), 723-730 (1997), etc.]. The compound of the formula (2) is a compound having an eliminative group at its α-carbon, and induces addition-fragmentation chain transfer polymerization that a propagating radical at an end of an added monomer or a polymer obtained from the monomer attacks the unsaturated bond in the compound of the formula (2) to form a radical at the α-carbon of the compound of the formula (2), transfer of the radical causes elimination of the eliminative group (X), which is substituted on the methyl group at the α-position as a radical, and then, the thus-eliminated radical reacts to the monomer to form a polymer. As a result, an unsaturated bond derived from the compound of the formula (2) is formed at an end of the resultant polymer. In other words, a macromonomer with an unsaturated bond contained at an end thereof (the macromonomer that becomes "units A" in the present invention) is formed.

Describing in further detail, the eliminative group (X) can be at least one atom or group selected from the group of halogen atoms such as fluorine atom, chlorine atom, bromine atom and iodine atom; alkylthio groups such as methylthio group, ethylthio group, butylthio group, t-butylthio group, octylthio group, laurylthio group, cyclohexylthio group, benzylthio group, hydroxyethylthio group and carboxyethylthio group, and arylthio groups such as phenylthio group, naphthylthio group, methylphenylthio group and ethylphenylthio group; alkylsulfoxide groups and phenylsulfoxide groups such as methylsulfoxide group, ethylsulfoxide group, trichloromethylsulfoxide group, trifluoromethylsulfoxide group and benzylsulfoxide group; arylsulfoxide groups such as methylphenyl sulfoxide group and naphthylsulfoxide group; and benzyloxy groups and alkylbenzyloxy groups such as benzyloxy group and methylbenzyloxy group. Particularly preferred in the present invention are halogen compounds such as bromine atom and alkylthio groups such as t-butylthio group and lauothio group, which are available relatively easily.

The compound of the formula (2) can be obtained by a conventionally-known production process, and no particular limitation is imposed on its production process. As a production process, it can be obtained, for example, by causing formaldehyde to act on acrylic acid or its ester compound in the presence of a strong base such as diazabicyclo (2.2.2) octane or diazabicyclo (5.4.0)undecene to methylolate the α-carbon of the acryloyloxy group or reacting formaldehyde to triethyl phosphonoacetate to obtain an α-hydroxymethylacrylic acid or its ester compound, and then halogenating the hydroxyl group of the resultant product, for example, with phosphorus trichloride, phosphorus tribromide or the like. As an alternative, hydrogen bromide can be reacted to diethyl bis(hydroxymethyl)malonate to obtain its halide directly.

Further, an alkylthio group, arylthio group, alkylsulfoxide group or arylsulfoxide group can be introduced into the halide by reacting an alkyl thiol, aryl thiol, alkylsulfonic acid or arylsulfonic acid to the halide in the presence of a base such as triethylamine to conduct an interchange reaction with the halide. Furthermore, a benzyloxy group can be introduced into the halide by benzyletherifying the halide with benzyl alcohol or the like in the presence of potassium t-butoxide.

As the acrylic acid or acrylate ester compound to be used upon introducing the eliminative group to the α-carbon, one known to date can be used and no particular limitation is imposed thereon. Specific examples include acrylic acid; alkyl and cycloalkyl esters of acrylic acid, such as the methyl, ethyl, propyl, isopropyl, butyl, isobutyl, t-butyl, 2-ethylhexyl, lauryl, benzyl, cyclohexyl, 3,3,5-trimethylcyclohexyl, t-butylcyclohexyl, cyclodecyl and isobornyl esters of acrylic acid; (poly) alkylene glycol acrylates, their alkyl ethers, and their esterified products with dibasic acids such as phthalic acid; and amino-containing acrylate esters such as the dimethylaminoethyl, diethylaminoethyl and t-butylaminoethyl esters of acrylic acid. When the eliminative group is introduced to the methyl group at the α-position by using acrylic acid or an acrylate ester as described above, the compound of the formula (2) having the one eliminative group is obtained.

As the compound of the formula (2), an α-substituted methylacrylic acid having two or more eliminative groups or an ester thereof can also be used. It can be obtained by using a compound containing two or more acryloyloxy groups, methylolating it in a similar manner as in the above, and then subjecting the methylolation product to halogenation, alkylthioation, alkylsulfoxidation or the like.

As the compound containing two or more acryloyloxy groups, one known to date can be used and no particular limitation is imposed thereon. Specific examples include acryloyloxy-containing polymers obtainable by esterifying, with acrylic acid, hydroxyl groups in polymers, such as hydroxyl-containing poly(meth)acrylates. These hydroxyl-containing poly(meth)acrylates can be obtained by homopolymerizing ethylene glycol, propylene glycol, glycerin, trimethylolpropane, pentaerythritol, dipentaerythritol, sorbit, sorbitol, and their (poly)alkylene glycol derivatives; (poly) alkylene glycol derivatives such as bisphenol A, hydrogenated bisphenol A and bisphenol S; esters containing hydroxyl groups at both ends thereof, such as the ester of ethylene glycol and adipic acid; and hydroxyl-containing, radical polymerizable monomers such as 2-hydroxyethyl (meth) acrylate, 2-hydroxypropyl (meth) acrylate and 4-hydroxybutyl (meth) acrylate, or by copolymerizing them with other monomers. By using these polymers, methylolating them, and then subjecting the methylolation products to halogenation, alkylthioation, alkylsulfoxidation or the like as described above, compounds of the formula (2) can also be obtained. The use of these polymers results in the compounds of the formula (2) each of which has two or more eliminative groups.

By polymerizing a radical polymerizable monomer in the presence of such a compound of the formula (2), it is then possible to obtain a methacrylic polymer containing at least one group represented by the formula (1) at an end, that is, a macromonomer (which may hereinafter be simply called "the macromonomer"). The term "macromonomer" means a monomer of high molecular weight, which is a polymer-type monomer having at an end thereof a group containing a polymerizable double bond. By copolymerizing it with another radical polymerizable monomer to incorporate units A in the resulting copolymer, the copolymer is obtained with a high molecular chain derived from the units A.

The radical polymerizable monomer to be polymerized with the compound of the formula (2) is specifically methacrylic acid or its ester in the present invention, because the use of a radical polymerizable monomer, for example, a vinyl monomer such as styrene, an acrylic monomer such as butyl acrylate or an amide monomer such as acryl amide in the polymerization with the compound of the formula (2) induces a radical polymerization reaction between its unsaturated bond and the unsaturated bond in the compound of the formula (2) so that the compound of the formula (2) is incorporated as a polymer component in the resulting polymer to make it difficult to obtain a polymer having the unsaturated bond in the unit of the formula (1) at an end thereof. Methacrylic acid or its ester has low polymerizability with the unsaturated bond in the unit of the formula (1), and can undergo addition-fragmentation chain transfer polymerization to provide a macromonomer having the unsaturated bond in the unit of the formula (1) at an end thereof.

As methacrylic acid or its ester to be used, one known to date can be used and no particular limitation is imposed thereon. Specific examples include methacrylic acid, methacryloyloxyethylsulfonic acid, methacryloyloxyethanephosphoric acid, and their esters; alkyl and cycloalkyl esters of methacrylic acid, such as the methyl, ethyl, propyl, isopropyl, butyl, isobutyl, t-butyl, 2-ethylhexyl, lauryl, benzyl, cyclohexyl, 3,3,5-trimethylcyclohexyl, t-butylcyclohexyl, cyclodecyl and isobonyl esters of methacrylic acid; esters of (poly) alkylene glycol methacrylates, their esterified products with dibasic acids such as phthalic acid, and their alkyl ethers; amino-containing methacrylate esters such as the dimethylaminoethyl, diethylaminoethyl, t-butylaminoethyl, trimethylammonium ethyl chloride and dimethylbenzylammonium ethyl chloride esters of methacrylic acid; methacrylic acid monomers containing a reactive functional group, such as glycidyl methacrylate, oxetane-group-containing methacrylates and methacryloyloxyethyl isocyanate; fluorinated methacrylates and silicone methacrylates, such as (poly)fluoroalkyl methacrylates and polysiloxane-group-containing methacrylates; and functional methacrylic monomers such as methacrylic-group-bound, benzotriazole ultraviolet absorbers, benzophenone ultraviolet absorbers and pigments like azo compounds. These methacrylic acid and esters can be used either singly or in combination.

When the copolymer D of the present invention is used in an aqueous medium, it is preferred to incorporate monomer units, each of which contains an acid group capable of forming a salt upon neutralization, in the macromonomer such that the copolymer D is rendered hydrophilic and the acid value is controlled to from 50 to 300 mgKOH/g. As the acid group capable of forming the salt upon neutralization, a carboxyl group, sulfonic group or phosphoric group can be mentioned. Specific usable monomers include carboxyl-containing monomers obtainable by reacting a dibasic acid with methacrylic acid or (poly)alkylene glycol methacrylates into half esters; sulfonic-containing monomers such as methacryloyloxyethylsulfonic acid; and phosphoric-containing monomers such as methacryloyloxyethanephosphoric acid and its esters. These monomers can be used either singly or in combination.

As to the amount of this acid-group-containing monomer to be used, the side chains of the pigment dispersant obtained using the copolymer D of the present invention or the resulting resin dispersion must show sufficient hydrophilicity, and the acid value of the macromonomer to be introduced may be preferably from 50 to 300 mgKOH/g, more preferably from 100 to 250 mgKOH/g. An acid value smaller than 50 mgKOH/g requires the introduction of the macromonomer in a greater amount to provide the copolymer D with increased hydrophilicity, and in such a case, an inconvenience arises such that the macromonomer does not react for its polymerizability and remains in the polymerization system.

If the acid value of the macromonomer is greater than 300 mgKOH/g, the macromonomer can be introduced in a smaller amount in the copolymer D. Correspondingly, however, the amount of the macromonomer in the copolymer D decreases so that the properties of the macromonomer may not be exhibited or the copolymer D may not show sufficient hydrophilicity. If the macromonomer is introduced in such a large amount, the copolymer D is provided with excessively high hydrophilicity so that a pigment dispersion prepared using the copolymer D may not be suited for the maintenance of stability or, when the copolymer D is incorporated in an article, the article may be provided with deteriorated waterproofness.

By polymerizing the compound of the formula (2) and a methacrylic monomer with an azo initiator or peroxide initiator in accordance with conventionally-known solution polymerization, bulk polymerization, suspension polymerization or emulsion polymerization, a macromonomer can be obtained with groups represented by the formula (1). When polymerized by solution polymerization, the macromonomer can be used as it is, or can be used after causing it to precipitate in a poor solvent or neutralizing it with an acid or alkali to precipitate it and then collecting it in the form of a solid. The macromonomer can be used in the form of a solid after collecting it by filtration in the case of suspension polymerization or in the form of a solid after conducting heating or salting out and collecting only the resin in the case of solution polymerization or emulsion polymerization.

Solution polymerization can be conducted by a conventionally-known polymerization process in a conventionally-known liquid medium which can dissolve the compound of the formula (2) and the methacrylic monomer. Usable examples of the liquid medium include water; and as organic solvents, toluene, xylene, methyl ethyl ketone, ethyl acetate, ethanol, isopropanol, propylene glycol monoalkyl ethers, ethylene glycol monoalkyl ethers, propylene glycol, dimethylformamide, dimethylsulfoxide, methylene chloride, tetrahydrofuran, and hexane. They can be used either singly or in combination, and no particular limitation is imposed on the liquid medium.

When the copolymer D is obtained in a water-soluble form, the copolymer D can be formed into an aqueous solution after its polymerization by neutralizing it with alkaline water while using a water-soluble organic solvent, for example, an alcohol solvent such as ethanol or isopropanol or a glycol solvent such as ethylene glycol monoalkyl ether, diethylene glycol monoalkyl ether or propylene glycol monomethyl ether.

No particular limitation is imposed on the molecular weight of the macromonomer. If the molecular weight of the macromonomer is excessively high, however, the macromonomer may not contribute to the polymerization and may remain in the polymerization system. Further, such an excessively high molecular weight results in the introduction of fewer macromonomer molecules in the backbone of the copolymer D, so that the performance of the macromonomer cannot be exhibited fully. The macromonomer, therefore, has to be introduced evenly in the copolymer D. The molecular weight of the macromonomer may be from 500 to 100,000, preferably from 1,000 to 30,000, more preferably from 2,000 to 10,000 in terms of number average molecular weight (GPC, polystyrene calibration).

In the present invention, the copolymer D of the present invention, which is useful as a pigment dispersant or resin dispersion, can be obtained by copolymerizing the macromonomer, which is obtainable as described above, and the monomer for units B, optionally together with the other monomer for units C as needed.

When the above-described macromonomer is used, the reactivity of its end group is known to be relatively poor unlike the radical polymerizability of the unsaturated bond of a conventional (meth)acrylic monomer or vinyl monomer. As a result, radical polymerization with another monomer in the presence of this macromonomer is known to cause the binding of an end radical of a polymer of another monomer with the terminal double bond of the macromonomer so that up to two polymer chains can bind to one group of the formula (1). An aromatic vinyl monomer (the monomer for units B) is known to be particularly suited as the monomer to be copolymerized, and the present invention is characterized by the use of this monomer for units B as a comonomer. If a methacrylate monomer is employed without using the monomer for units B, addition-fragmentation chain transfer polymerization occurs again to terminal double bond groups, and therefore, the copolymer D of the present invention cannot be obtained.

There are also macromonomers each of which contains a (meth) acrylic group at an end thereof. They are each a polymer having at an end thereof a radical-polymerizable, unsaturated bond of a (meth) acrylic group and obtained by polymerizing a monomer with use of a chain transfer agent such as hydroxyethyl thiol or 2-mercaptoethylcarboxylic acid to obtain a polymer with a hydroxyl group or carboxyl group introduced to an end thereof, and reacting the resultant polymer with isocyanatoethyl (meth)acrylate or the like in the case of the hydroxyl group or reacting the resultant polymer with glycidyl methacrylate or the like in the case of the carboxyl group. When such a macromonomer is used, its terminal unsaturated bond is high in reactivity so that the macromonomer undergoes usual radical polymerization with another radical-polymerizable monomer to afford a graft polymer.

When such a macromonomer is used and polymerized with another radical-polymerizable monomer, however, the use of the macromonomer in a large amount may cause the macromonomer to remain as it is without polymerization in some instances, leading to the problem that it cannot be introduced in such a large amount. The percent introduction of the macromonomer is hence as low as 40 wt % or so. However, it has been found that, when the above-described macromonomer useful in the present invention is employed, the macromonomer takes part in its entirety in the polymerization even if the macromonomer is used abundantly, leading to the finding that the macromonomer is very useful as a macromonomer to be introduced.

In the present invention, it is also possible to use another monomer for units C as needed, which is copolymerizable with the monomer for units B. The copolymer D according to the present invention can, therefore, be obtained from the macromonomer, the monomer for units B and the monomer for units C as needed.

The macromonomer in the present invention is known to take part in the polymerization that as described above, the coexisting monomer undergoes polymerization to form a polymer, the terminal propagating radical of the polymer binds to the unsaturated bond in the formula (1), and therefore, up to two polymer chains bind. In the present invention, however, it is not absolutely necessary to have two polymer chains bound to the one unsaturated bond in the formula (1). The present invention is characterized in that in the copolymer D obtained by the polymerization of the macromonomer, the monomer for units B and another monomer for units C, the respective units exhibit their own functions. Accordingly, the binding of one polymer chain to the unsaturated bond of the macromonomer may result in a block copolymer, while the binding of two polymer chains to the unsaturated bond of the macromonomer may lead to a form that one macromonomer chain is grafted on a copolymer, specifically to the form of a T-shaped, branched copolymer D formed of one macromonomer chain, the monomer for units B and the monomer for units C.

When a macromonomer having two or more groups of the formula (1) is used, two or more polymer chains can bind to the two or more groups of the formula (1). When a macromonomer having two groups of the formula (1) is used, for example, four polymer chains bind to form a branched structure consisting of 6 chains including the macromonomer. Namely, the copolymer D according to the present invention, which has been obtained using a macromonomer having two or more groups of the formula (1), is a highly-branched, star-shaped copolymer.

To such a highly-branched polymer, two polymer chains can further bind to each of the groups of the formula (1) as described above. However, the binding of such additional polymer chains is not absolutely needed. When a macromonomer having three groups of the formula (1) is used, for example, six chains of a polymer formed from the monomer for units B and another monomer for units C can bind. Even with four chains of such a polymer, a copolymer D of a branched structure according to the present invention can still be formed, and therefore, is also usable satisfactorily in the present invention.

The amount of the macromonomer (units A) in the copolymer D of the branched structure according to the present invention is from 5 to 95 wt %, preferably from 20 to 80 wt % when the total of the macromonomer and the units B is assumed to be 100 wt %. If the amount of the macromonomer is smaller than 5 wt %, the properties of the macromonomer hardly appear on the copolymer D of the branched structure, and further, a polymer formed from a monomer for units B and/or another monomer for units C may exist without binding to the macromonomer. If the amount of the macromonomer is greater than 95 wt %, on the other hand, the properties of the polymer formed from the monomer for units B and/or another monomer for units C hardly appear on the copolymer of the branched structure, and further, the macromonomer may remain as it is in the polymerization system without binding.

As the monomer for units B in the present invention, a conventionally known monomer can be used. Specific examples include styrene, α-methylstyrene, vinyltoluene, vinylxylene, vinyldimethylbenzene, vinyltrimethylbenzene, vinylethylbenzene, vinylpyridine, vinylimidazole, vinylnaphthalene, chloromethylstyrene, methoxystyrene, dimethylaminomethylstyrene, hydroxymethylstyrene, styrenecarboxylic acid and its metal salts, and styrenesulfonic acid and its metal salts. Particularly preferred are styrene, α-methylstyrene, vinyltoluene, vinyldimethylbenzene, vinylethylbenzene, and vinylnaphthalene.

The monomer for units B acts not only to control such polymerization as described above, but also to provide the copolymer D with higher compatibility with pigments, and, when the copolymer is used as a pigment dispersant, to provide the copolymer D with increased pigment adsorbability and good pigment microdispersibility. When the total of the macromonomer and the units B is assumed to be 100 wt %, the units B are contained at from 95 to 5 wt % in the copolymer D. This amount of the units B may preferably be from 80 to 20 wt % for similar reasons as the above-described amount of the macromonomer.

Upon polymerization with the macromonomer, another monomer for units C may also be used as needed in addition to the monomer for units B. The monomer for units C is needed to be a monomer that is radically polymerizable with the monomer for units B. A conventionally-known monomer can be used, and no particular limitation is imposed thereon. Illustrative are such (meth)acrylic acid monomers as described above; amide monomers such as (meth) acrylamide, (meth) acryldimethylamide and dimethylpropanesulfonic acid acrylamide; unsaturated-bond-containing dibasic acid monomers such as fumaric acid, crotonic acid, maleic acid and itaconic acid, and their aliphatic, alicyclic or aromatic half esters or diesters; and vinyl monomers such as vinyl acetate, propyl acetate, vinylpyrrolidone, vinyl chloride, vinylidene chloride, ethylene, propylene, phenylmaleimide and cyclohexylmaleimide. In the polymerization between the macromonomer and the monomer for units B, these monomers can provide the resulting copolymer D with modified properties.

When the copolymer D according to the present invention is used as a pigment dispersant, the use of a functional-group-containing monomer for units C in the copolymer D can provide the pigment dispersant with increased adsorbability on a pigment to increase pigment dispersibility. The functional group can be one selected from the group consisting of nitrogen-containing heterocyclic groups such as carboxyl group, hydroxyl group, sulfonic group, phosphoric group, amino group, quaternary ammonium group, imidazolyl group, benzotriazolyl group and pyridyl group. Therefore, a conventionally-known monomer can be used, and no particular limitation is imposed thereon. In the present invention, the use of the above-described monomer for units C is not essential. When the above-described monomer for units C is used, however, the amount of the monomer for units C can be in a range of from about 5 to 200 parts by weight when the total of the macromonomer and the monomer for units B is assumed to be 100 parts by weight. No problem arises even if the monomer for units C is used in an amount smaller than the above-described range. However, the use of the monomer for units C in an amount greater than the above-described range may cause a polymerization reaction of the monomer for units C with the macromonomer, so that the structure of the present invention may not be obtained or the performances of the macromonomer and units B may not be exhibited to full extents.

The molecular weight of the copolymer D according to the present invention, which has the above-described constitution, may be in a range of from 1,000 to 100,000 in terms of number average molecular weight (GPC, polystyrene calibration). When the copolymer D is used as a pigment dispersant, a number average molecular weight lower than 1,000 may provide the resulting pigment dispersion with poor dispersion stability. When a resin dispersion is used as a coating formulation, such a low number average molecular weight provides the resulting coated article with poor durability. When the copolymer D is used as a pigment dispersant, a number average molecular weight higher than 100,000, on the other hand, provides the resulting pigment dispersion with unstability in terms of the dispersion of the pigment so that the pigment cannot be dispersed as microparticles.

When the copolymer D of the branched structure according to the present invention is used in an aqueous pigment dispersant or resin dispersion, the macromonomer contained in the copolymer D may preferably have an acid value of from 50 to 300 mgKOH/g as described above, and the overall acid value of the copolymer D may be preferably from 50 to 250 mgKOH/g, more preferably from 60 to 200 mgKOH/g, including both the above-described acid value of the macromonomer units and the acid value of the units C copolymerized as needed and containing acid groups. When the copolymer D is used in an aqueous medium, an acid value of smaller than 50 mgKOH/g does not provide the copolymer D with sufficient hydrophilicity so that the copolymer D may not show water solubility or water dispersibility. An acid value of greater than 250 mgKOH/g, on the other hand, provides the copolymer D with excessively high hydrophilicity so that the copolymer D is not suited as a pigment dispersant. As a coating formulation, the resulting article is provided with significantly deteriorated waterproofness. For providing the copolymer D with hydrophilicity, a hydrophilic monomer having a hydroxyl group, amino group or polyalkylene glycol chain, such as those described above, may also be used in combination.

A description will next be made about a process for the production of the copolymer D of the present invention useful as a pigment dispersant and resin dispersion. The copolymer D according to the present invention is significantly characterized in that as described above, it has the structure that the properties of the polymers formed of the macromonomer, units B and units C are independently retained, in other words, the respective units are different in properties. The copolymer D according to the present invention is significantly characterized in that the macromonomer and the polymer formed of the units B and units C are independent from each other in function such that the macromonomer is good in solvent solubility and the polymer is high in pigment compatibility and is insoluble in a liquid medium.

According to solution polymerization, the copolymer D can be obtained by directly adding the monomer for units B and the monomer for units C subsequent to the production of the macromonomer as described above, and then conducting solution polymerization. When the macromonomer is obtained in a solid form, on the other hand, the copolymer D can be obtained by dissolving the macromonomer in a liquid medium capable of dissolving the macromonomer, adding the monomers, and then conducting solution polymerization. When it is desired to use the copolymer D as a pigment dispersant in aqueous systems, the copolymer D can be obtained as a pigment dispersant for aqueous systems by dissolving the acid-group-containing macromonomer in a liquid medium capable of dissolving it, adding the monomers, and subsequent to polymerization, neutralizing the acid groups with an alkaline substance to provide water compatibility. These polymerization processes and the liquid media to be used are conventionally known as described above, and no particular limitations are imposed thereon.

Alkaline substances usable for the neutralization include the hydroxides and carbonates of alkali metals and transition metals, ammonia, and amines. Illustrative are lithium hydroxide, sodium hydroxide, potassium hydroxide, sodium carbonate, potassium carbonate, ammonia, hydrazine, morpholine, N-methylmorpholine, trimethylamine, triethylamine, ethanolamine, diethanolamine, triethanolamine, aniline, 2,2,6,6-tetramethylpiperidine, 2,2,6,6-tetramethyl-4-piperidinol, 1,2,2,6,6-pentamethylpiperidine, 1,2,2,6,6-pentamethyl-4-piperidinol, and aminomethylpropanol. They can be used either singly or in combination.

The copolymer D of the present invention, which is useful as a pigment dispersant, is characterized in that its macromonomer has sufficient compatibility with a liquid medium as a dispersion medium for a pigment and is soluble in the liquid medium and also in that it has a structure that shows compatibility with the pigment. When the liquid medium is an organic solvent, aromatic rings originated from the monomer for units B and the above-described functional groups provide increased compatibility with the pigment to increase the pigment adsorbability, and the macromonomer increases the compatibility with the liquid medium. It is, therefore, possible to finely disperse the pigment, and hence to obtain a pigment dispersion having good storage stability. When the liquid medium is aqueous, the above-described macromonomer which has been obtained by neutralizing the acid groups is high in hydrophilicity, and therefore, is dissolved in water, so that the copolymer D formed of the macromonomer, units B and units C is adsorbed on the pigment owing to its hydrophobic action or owing to the above-described functional-group-containing monomer copolymerized as needed. It is, therefore, possible to finely disperse the pigment, and hence to obtain a pigment dispersion having good storage stability.

A description will next be made about the preparation of a resin dispersion by dissolving a macromonomer, which has been obtained by solution polymerization, or a macromonomer, which has been collected in a solid form as described above, in a liquid medium and then copolymerizing a monomer for units B and another monomer for units C such that a copolymer D insoluble in the liquid medium can be formed.

When the copolymer D obtained by dissolving the macromonomer in a liquid medium, for example, water or an organic solvent as described above and then adding and polymerizing the monomer for units B and the monomer for units C is not soluble in the liquid medium, the macromonomer equipped with solubility acts to disperse or emulsify the copolymer D in the form of particles of from several nanometers to several micrometers, preferably from 20 nm to 1 μm, more preferably from 50 nm to 500 nm so that a resin dispersion is formed.

The resin dispersion in the water-based liquid medium can be obtained by homopolymerizing or copolymerizing, as a water-soluble macromonomer, such an acid-group-containing monomer as described above, a hydroxyl-containing methacrylate ester monomer such as hydroxyethyl methacrylate, a methacrylate monomer of polyethylene glycol, a polyethylene glycol-polypropylene glycol random or block copolymer, or an alkyl ether or alkyl ether thereof, or the like. When the acid-group-containing monomer is used, the resin dispersion in the water-based liquid medium can be obtained by polymerizing a monomer for units B and another monomer for units C with a conventionally-known initiator in the presence of a macromonomer obtained by neutralizing the acid group with the above-described alkaline substance.

A resin dispersion, which makes use of an organic solvent as a liquid medium, can be obtained by polymerizing a monomer for units B and another monomer for units C with a conventionally-known initiator in the presence of a macromonomer designed to be dissolved in the organic solvent such that the resulting copolymer D is not soluble in the organic solvent, although it is not necessary so because as examples of a macromonomer soluble in an organic solvent, a variety of macromonomers exists depending on organic solvents.

As a specific example, a very stable resin dispersion can be afforded by obtaining a macromonomer from a long-chain alkyl methacrylate monomer such as 2-ethylhexyl methacrylate as a homopolymerization or copolymerization component in an aliphatic hydrocarbon solvent and then polymerizing styrene and vinyl acetate in the presence of macromonomer, because a copolymer of styrene and vinyl acetate is insoluble in the hydrocarbon solvent and hence, the dissolved macromonomer undergoes copolymerization to stabilize the copolymer D as particles. In this case, the proportions of the macromonomer, the monomer for units B and the monomer for units C are as described above, although the content of the macromonomer may preferably be 20 wt % or more of the whole monomers especially for the stabilization of the resin dispersion.

The copolymer D according to the present invention can be used as a pigment dispersant or as a film-forming component of the resin dispersion type. To use the copolymer D of the present invention as a pigment dispersant, the copolymer D, a pigment and a liquid medium are mixed to disperse the pigment, and if necessary, classification is further conducted. As a result, a pigment dispersion can be obtained. As pigments which can be prepared into pigment dispersions by using the copolymer D according to the present invention, conventionally-known pigments are all usable.

Illustrative organic pigments include phthalocyanine pigments, azo pigments, azomethineazo pigments, azomethine pigments, anthraquinone pigments, perinone/perylene pigments, indigo/thioindigo pigments, dioxazine pigments, quinacridone pigments, isoindoline pigments, isoindolinone pigments, and carbon black pigment. On the other hand, illustrative inorganic pigments include extender pigments, titanium oxide pigments, iron oxide pigments, and spinnel pigments. A conventionally-known pigment can also be prepared into a pigment dispersion by making combined use of a pigment derivative having a structure similar to the conventionally-known pigment as needed and then conducting dispersion processing. For use in the present invention, a pigment may desirably be chosen based on the application purpose in view of its kind, particle size and processing. Except for cases in which the pigment dispersion requires hiding power, a microparticulate, organic pigment is desired. Especially when transparency is desired, it is desirous to eliminate pigment particles of 0.5 μm and greater such that the average particle size is controlled to 0.15 μm or smaller.

To obtain a pigment dispersion by using the pigment dispersant of the present invention, a liquid medium and a pigment, there are two methods. According to one of the methods, the pigment is treated beforehand with the pigment dispersant (the copolymer D), and subsequent to incorporation of various additives as needed, the resultant mixture is dispersed in the liquid medium. According to the other method, the untreated pigment, the pigment dispersant, the liquid medium, and if necessary, various additives are mixed, and the resultant mixture is subjected to dispersion processing in a disperser.

According to the method that treats the pigment beforehand with the pigment dispersant and then disperses the thus-treated pigment in the liquid medium, the pigment, dispersant and liquid medium are mixed, and if necessary, the resultant mixture is subjected to dispersion processing in a disperser. An acid such as sulfuric acid, hydrochloric acid or acetic acid is added to acid out the pigment or the pigment is caused to precipitate in a poor solvent, so that pigment particles are coated with the pigment dispersant. The coated pigment particles are then subjected to filtration, water washing, drying and grinding to obtain the treated pigment. The treated pigment is then poured into an alkali-containing water so that the treated pigment is neutralized and dissolved. As an alternative, the treated pigment is poured into an organic solvent and is dissolved. If necessary, dispersion processing is performed in a disperser. In the above-described manner, a pigment dispersion can be obtained.

According to the method that mixes the untreated pigment and the pigment dispersant in the liquid medium, and subjects the resultant mixture to dispersion processing in a disperser, on the other hand, the pigment dispersant of the present invention, the pigment and, if necessary, various additives are added, and subsequent to premixing as needed, dispersion is performed in the disperser to obtain a pigment dispersion. No particular limitation is imposed on the disperser to be used in the present invention, and a conventionally-known disperser can be used. Usable examples include a kneader, an attritor, a ball mill, a sand mill or horizontal medium disperser making use of glass or zircon, and a colloidal mill.

The concentration of the pigment in the pigment dispersion may be preferably from 0.5 to 50 wt %, more preferably from 0.5 to 30 wt %. The content of the dispersant in the pigment dispersion may desirably be from 5 to 500 parts by weight per 100 parts by weight of the pigment. The viscosity of the pigment dispersion may be preferably from 1 to 50 mPas, more preferably from 2 to 30 mPas. It is particularly important to note that the use of the pigment dispersant according to the present invention provides the resulting pigment dispersion with excellent viscosity stability over time.

To the pigment dispersion, various additives can also be added in addition to the pigment, dispersant and liquid medium. For example, durability or fastness improvers such as ultraviolet absorbers and antioxidants, anti-settling agents, release agents or releasability improvers, fragrances, antimicrobial agents, antimolds, plasticizers, anti-drying agents and the like can be used. If necessary, dispersion aids, pigment treatments, dyes and the like can also be added. The resulting pigment dispersion can be used as it is, but from the standpoint of providing the pigment dispersion with enhanced reliability, it is preferred to remove coarse particles, which may exist a little, by a centrifuge, ultracentrifuge or filter.

By using the pigment dispersant of the present invention as described above, pigment dispersions can be obtained. These pigment dispersions can be used as colorants in conventionally-known paints, inks, coating compositions, stationeries and toners. Described specifically, they can be used as colorants in water-based paints, oil-based paints, gravure inks, water-based flexographic inks, inkjet inks, inks for stationeries, inks for writing utensils, coating compositions, colors for color filters, wet toners and the like. The amount of the pigment dispersant to be added varies depending on the concentration of the pigment and cannot be specified in a wholesale manner. The pigment dispersant can be used as much as needed depending on the required coloring density.

The resin dispersion with the copolymer D of the present invention contained therein can be used by adding it to paints, inks, coating compositions, stationeries and toners. It can be used as film-forming components or lustering or matting additives in conventionally-known paints, inks, coating compositions and stationeries, more specifically and for example, paints, oil paint varnishes for offset inks, binders for gravure inks, inkjet inks, inks for stationeries, coating compositions, alkali-strippable resists for color filters, wet toners and the like, and can impart high adhesion or high glossiness to films. When a water-based resin dispersion is used as an emulsion, the resulting film is provided with excellent waterproofness because it does not contain any surfactant as an emulsifier. The amount of the resin dispersion to be added for each application cannot be specified in a wholesale manner, but may be preferably from 3 to 50 wt %, more preferably from 5 to 30 wt % of the whole amount.

The pigment dispersion, which is obtained by using the pigment dispersant of the present invention, may also contain colorants conventionally known for the above-described respective applications as needed, and therefore, can be used in combination with conventionally-known pigments, dyes, colored polymer beads, microcapsulated colors, and the like. As an illustrative pigment, for example, it is desired to disperse such a pigment or dye by a conventionally-known method, using as a dispersion aid a conventionally-known surfactant or high-molecular dispersant to obtain a high-concentration color with the pre-dispersed pigment contained therein, and to use the color as a colorant in its corresponding application.

When the resin dispersion is used for the above-described applications, a conventionally-known crosslinking agent can be additionally used to provide the resulting films with improved various durability, waterproofness, solvent resistance and the like. Useful examples of such a crosslinking agent include, but are not limited specifically to, isocyanate crosslinking agents, carbodiimide crosslinking agents, epoxy crosslinking agents, aziridine crosslinking agents, melamine crosslinking agents, oxazoline crosslinking agents, and acid anhydride crosslinking agents. Based on the solid content of the polymer in the pigment dispersant or pigment dispersion according to the present invention, the crosslinking agent can be used in an amount preferably of from 1 to 50 wt. %, more preferably from 3 to 20 wt. %, still more preferably from 5 to 10 wt. % in terms of solid. For the above-described applications, it is also possible to use, as an additive or additives, one or more of conventionally-known defoaming agents, preservatives, leveling agents, thickeners, moisture-retaining agents, plasticizers, antioxidants, ultraviolet absorbers, light stabilizers and the like.

EXAMPLES

The present invention will next be described more specifically based on examples. It should, however, be borne in mind that the present invention is by no means limited by these examples. It is also to be noted that all the designations "part" or "part" and "%" in the following examples are on a weight basis.

Synthesis Example 1

Synthesis of Compound 1 of Formula (2)

Into a 2-liter separable flask fitted with a stirrer, a reflux condenser and a thermometer, dimethylsulfoxide (500 parts), water (170 parts), ethyl acrylate (200 parts), paraformaldehyde (purity: 80%, 72.5 parts) and diazabicyclo (2.2.2) octane (15.6 parts) were charged. They were heated to 100° C., and subjected to a reaction for 4 hours. Although the contents were not homogeneous at the time of the charging, they turned into a homogeneous clear mixture around 60° C. Dilute hydrochloric acid (500 parts) was then added, followed by extraction twice with diethylether (200 parts, each). The extract was dried over anhydrous magnesium sulfate. After the thus-dried extract was concentrated in an evaporator, the concentrate was subjected to distillation under reduced pressure. Ethyl 2-(hydroxymethyl)acrylate was obtained (yield: 193 parts). The reaction product was identified to be the target compound by IR and NMR, and its purity was determined to be 98.7% by GC.

Into a 500-ml, three-necked Erlenmeyer flask fitted with similar devices, methylene chloride (200 parts) and ethyl 2-(hydroxymethyl)acrylate (48.8 parts) were next added, followed by cooling to −5° C. A solution of phosphorus tribromide (50 parts) in methylene chloride (50 parts) was then added dropwise over 1 hour. The resulting mixture was subjected to a reaction under stirring at the same temperature for 1 hour and further at 30° C. for 3 hours.

The reaction mixture was then washed twice with a 0.5% aqueous solution of sodium hydroxide (200 parts, each), and was washed further with saturated NaCl solution (200 parts). Drying, concentration and reduced-pressure distillation were then conducted in a similar manner as described above. Ethyl 2-(bromomethyl) acrylate was obtained (yield: 48 parts). The reaction product was identified to be the target compound by IR and NMR, and its purity was determined to be 99.1% by GC. This compound will hereinafter be referred to as "the compound 1 of the formula (2)".

Synthesis Example 2

Synthesis of Compound 2 of Formula (2)

Using a similar Erlenmeyer flask as described above, the compound 1 of the formula (2) obtained in Synthesis Example 1 (57.9 parts), methylene chloride (100 parts) and triethylamine (33.3 parts) were charged, followed by cooling to −5° C. A mixture of t-butyl thiol (29.7 parts) and methylene chloride (50 parts) was then added dropwise over 1 hour. The resulting mixture was subjected to a reaction at the same temperature for 1 hour and further at 50° C. for 3 hours. The reaction mixture was washed successively with water (200 parts), dilute hydrochloric acid (200 parts) and saturated NaCl solution. The reaction product was then processed in a similar manner as in Synthesis Example 1. Ethyl 2-(t-butylthiomethyl)acrylate was obtained (yield: 39.9 parts). The reaction product was identified to be the target compound by IR and NMR, and its purity was determined to be 97.6% by GC. This compound will hereinafter be referred to as "the compound 2 of the formula (2)".

Synthesis Example 3

Synthesis of Compounds 3 and 4 of Formula (2)

Into a 2-liter separable flask fitted with a stirrer, a reflux condenser and a thermometer, dimethylsulfoxide (100 parts), water (170 parts), dipropylene glycol diacrylate (24.2 parts), paraformaldehyde (purity: 80%, 3.75 parts) and diazabicyclo (2.2.2)octane (1.56 parts) were charged. They were heated to 100° C., and subjected to a reaction for 6 hours.

Dilute hydrochloric acid (500 parts) was then added, followed by extraction twice with diethyl ether (200 parts, each). The extract was dried over anhydrous magnesium sulfate. After the thus-dried extract was concentrated in an evaporator. Dipropylene glycol bis(2-(hydroxymethyl)acrylate) was obtained (yield: 24.7 parts). The reaction product was identified to be the target compound by IR and NMR. As a result of a calculation of its purity from the ratio of the methyl group to the unsaturated bond in propylene glycol, the purity was determined to be approximately 100%.

Into a 500-ml, three-necked Erlenmeyer flask fitted with similar devices, methylene chloride (100 parts) and dipropylene glycol 2-(hydroxymethyl)acrylate (15.1 parts) were next added, followed by cooling to −5° C. A solution of phosphorus tribromide (9.0 parts) in methylene chloride (10 parts) was then added dropwise over 1 hour. The resulting mixture was subjected to a reaction under stirring at the same temperature for 1 hour and further at 30° C. for 3 hours. The reaction mixture was then washed twice with a 0.5% aqueous solution of sodium hydroxide (200 parts, each), and was washed further with saturated NaCl solution (200 parts). Drying and concentration were then conducted in a similar manner as described above. Dipropylene glycol bis(2-(bromomethyl)acrylate) was obtained (yield: 18.4 parts). The reaction product was identified to be the target compound by IR and NMR. As a result of determination of its purity in a similar manner as described above, the purity was found to be approximately 100%. This compound will hereinafter be referred to as "the bifunctional compound 3 of the formula (2)".

Following the above-described procedure except for the use of a mixture of pentaerythritol tri- and tetra-acrylates in place of the dipropylene glycol diacrylate, a compound of the formula (2) was obtained. This compound will hereinafter be referred to as "the tri- to tetra-functional compound 4 of the formula (2)".

Polymerization Example 1

Synthesis of Macromonomers 1 and 2

Into a reactor fitted with a stirrer, a reflux condenser, a thermometer, a nitrogen inlet tube and a dripping funnel, diethylene glycol monobutyl ether (100 parts) and ethanol (100 parts) were charged, followed by heating to 78° C. Into a separate vessel, a monomer mixture of methyl methacrylate (60 parts), methacrylic acid (60 parts), butyl methacrylate (80 parts), the compound 1 of the formula (2) (8 parts) and a polymerization initiator ("V-601", product of Wako Pure Chemical Industries, Ltd.; 3 parts) was added dropwise over 2 hours. Subsequent to the dropwise addition, "V-601" (1 parts) was added, followed by polymerization for 4 hours. The resulting resin solution will hereinafter be referred to as "the macromonomer 1". The number average molecular weight was found to be 4,800 by GPC. There was no smell of residual monomer. Its solid content was determined to be 50.3%. Substantially all the monomers were, therefore, confirmed to be polymerized. Further, the acid value of the macromonomer was 195.7 mgKOH/g.

A portion of the macromonomer solution was caused to precipitate in water, the precipitate was then dissolved in ethanol, and then, the solution was caused to precipitate in water. This purification procedure was repeated. An NMR spectrum of the thus-precipitated resin was measured. As a result, chemical shifts attributable to unsaturated bonds were observed at 5.9 and 6.3 ppm, respectively. In addition, an unsaturated bond was found at 1,680 $cm^{-1}$ by IR. The precipitated resin will hereinafter be referred to as "the macromonomer 2".

Polymerization Example 2

Synthesis of Macromonomers 3, 4, 5 and 6

Into a similar reactor as in Polymerization Example 1, propylene glycol monopropyl ether (150 parts) and ethanol (150 parts) were charged, followed by heating to 75° C. Into a separate vessel, a monomer mixture of methyl methacrylate (30 parts), methacrylic acid (30 parts), butyl methacrylate (40 parts), the compound 1 of the formula (2) (the predetermined amount shown in Table 1) and "V-601" (1.5 parts) was added dropwise over 2 hours. Subsequent to the dropwise addition, "V-601" (0.5 parts) was added, followed by polymerization for 4 hours. By varying the amount of the compound 1 of the formula (2), macromonomers were obtained. These macromonomers are shown together in Table 1. They were all purified, and were all confirmed to contain unsaturated bonds by NMR.

TABLE 1

|  | Macromonomers | | |
| --- | --- | --- | --- |
|  | 3 | 4 | 5 |
| Amount of the compound 1 (parts) | 2.5 | 3.9 | 5 |
| Number average molecular weight | 6,000 | 4,400 | 4,000 |

Among these macromonomers, the macromonomer 5 was caused to precipitate, and the resulting solid macromonomer will hereinafter be referred to as "the macromonomer 6".

Polymerization Example 3

Synthesis of Macromonomers 7, 8, 9 and 10

Into a similar reactor as in Polymerization Example 1, propylene glycol monomethyl ether acetate (200 parts) was charged, followed by heating to 80° C. Into a separate vessel, a monomer mixture of the monomer composition, which is shown in Table 2 and contained the compound 2 of the formula (2), and "V-601" (1.5 parts) was added dropwise over 2 hours. Subsequent to the dropwise addition, "V-601" (0.5 parts) was added, followed by polymerization for 4 hours. By varying the amount of the compound 2 of the formula (2), macromonomers were obtained. These macromonomers are shown together in Table 2. They were also confirmed to contain unsaturated bonds by NMR.

TABLE 2

|  | Macromonomers | | | |
| --- | --- | --- | --- | --- |
| Monomer composition | 7 | 8 | 9 | 10 |
| MMA (parts) | 10 | 20 | — | — |
| IBMA (parts) | 30 | 25 | — | — |
| HEMA (parts) | — | 15 | 10 | 5 |
| 2EHMA (parts) | 60 | 40 | 15 | — |
| BzMA (parts) | — | — | 75 | 85 |
| MAA (parts) | — | — | — | 10 |
| Amount of the compound 2 (parts) | 2.5 | 3 | 3.5 | 3.5 |
| Number average molecular weight | 5,600 | 4,800 | 5,000 | 4,900 |

MMA: Methyl methacrylate
IBMA: Isobutyl methacrylate
HEMA: 2-Hydroxyethyl methacrylate
2EHMA: 2-Ethylhexyl methacrylate
BzMA: Benzyl methacrylate
MAA: Methacrylic acid Polymerization Example 4

Synthesis of Macromonomer 11

Into a similar reactor as in Polymerization Example 1, "ISOPAR G" (200 parts) was charged, followed by heating to 80° C. In a separate vessel, 2-ethylhexyl methacrylate (80 parts), lauryl methacrylate (120 parts), the compound 1 of the formula (2) (5 parts) and azobisisobutyronitrile (1.5 parts) were mixed into a solution. The thus-prepared monomer mixture was added dropwise into the reactor over 2 hours. Subsequent to the dropwise addition, azobisisobutyronitrile (0.5 parts) was added, followed by polymerization for 4 hours. Likewise, this polymerization product will hereinafter be referred to as "the macromonomer 11". Its number average molecular weight was found to be 5,500 by GPC.

Polymerization Example 5

Synthesis of Macromonomers 12 and 13

A macromonomer solution, which had been obtained in a similar manner as in Polymerization Example 1 except for the use of the bifunctional compound 3 of the formula (2) in place of the compound 1 of the formula (2), will hereinafter be referred to as "the macromonomer 12". Its number average molecular weight was 8,300. Further, a macromonomer solution, which had been obtained in a similar manner as in Polymerization Example 2 except for the use of the tri- to tetra-functional compound 4 of the formula (2) in place of the compound 2 of the formula (2), will hereinafter be referred to as "the macromonomer 13". Its number average molecular weight was 7,200.

Comparative Example 1

Synthesis of Comparative Polymers 1 and 2

Into a similar reactor as in Polymerization Example 1, diethylene glycol monobutyl ether (100 parts) and ethanol (100 parts) were charged, followed by heating to 78° C. Into a separate vessel, a monomer mixture of methyl methacrylate (60 parts), methacrylic acid (60 parts), butyl methacrylate (80 parts), lauryl thiol (8 parts) and "V-601" (3 parts) was added dropwise over 2 hours. Subsequent to the dropwise addition, "V-601" (1 parts) was added, followed by polymerization for 4 hours. The resulting resin solution will hereinafter be referred to as "the comparative polymer 1", which had been obtained without using any compound of the formula (2) useful in the present invention and contained no α-substituted methyl acrylate ester groups. Its number average molecular weight was found to be 4,400 by GPC. A portion of the resin solution was caused to precipitate in water, and the thus-precipitated resin will hereinafter be referred to as "the comparative polymer 2".

Comparative Example 2

Synthesis of Comparative Polymer 3

Into a similar reactor as in Polymerization Example 1, diethylene glycol dimethyl ether (100 parts) was charged, followed by heating to 78° C. Into a separate vessel, a monomer mixture of methyl methacrylate (60 parts), methacrylic acid (60 parts), butyl methacrylate (80 parts), hydroxyethyl thiol (8 parts) and "V-601" (3 parts) was added dropwise over 2 hours. Subsequent to the dropwise addition, "V-601" (1 parts) was added, followed by polymerization for 4 hours. Isocyanotoethyl methacrylate (9.2 parts) was then added and allowed to react with terminal hydroxyl groups, so that methacrylic groups were introduced to the ends. The resulting resin solution will hereinafter be referred to as "the comparative polymer 3", which had been obtained without using any compound of the formula (2) useful in the present invention, contained no α-substituted methyl acrylate ester groups and contained methacrylic groups at the ends. Its number average molecular weight was found to be 4,600 by GPC. A portion of the resin solution was caused to precipitate in methanol/water, and the thus-precipitated resin was measured by NMR. As a result, it was possible to confirm unsaturated bonds at 5.6 and 6.1 ppm, respectively.

Example 1

Pigment Dispersant 1

Into a similar reactor as in Polymerization Example 1, the macromonomer 1 (solution) (80 parts), diethylene glycol monobutyl ether (30 parts) and ethanol (30 parts) were charged, followed by heating to 82° C. In a separate vessel, styrene (45 parts), 2-hydroxyethyl methacrylate (15 parts) and a polymerization initiator ("PERBUTYL O", product of NOF Corporation; 1.6 parts) were mixed to prepare a monomer solution. The monomer solution was added dropwise to the reactor over 1 hour, and at the same temperature, polymerization was then conducted for 6 hours. When a solution of potassium hydroxide (7.9 parts) in water (92.1 parts) was added to the polymerization mixture, no precipitation took place, and a pale, slightly-turbid, clear, aqueous solution was obtained.

In the above-described copolymer, the weight ratio of the macromonomer to the monomers was 40/60, and the acid value was 78.8 mgKOH/g. Its molecular weight was measured. In the visible range, the molecular weight distribution peak ascribable to the macromonomer 1 substantially disappeared, but a single peak ascribable to a still higher molecular weight appeared. In the ultraviolet range (measurement wavelength: 254 nm), on the other hand, a similar molecular weight distribution peak as that available in the visible range appeared, although a peak ascribable to α-substituted methyl acrylate residual groups appeared extremely slightly as the molecular weight distribution peak of the macromonomer 1. As a result, it was confirmed that a polymer having a number average molecular weight of 12,000 and a weight average molecular weight of 26,300 was obtained. There was no smell of residual monomer. Its solid content was determined to be 34.2%. Substantially all the monomers were, therefore, confirmed to be polymerized. This polymer will hereinafter be referred to as "the pigment dispersant 1". When a portion of the pigment dispersant 1 was diluted 10-fold with water, a pale, slightly-turbid, clear, aqueous solution was also obtained.

Comparative Example 3

Synthesis of Comparative Polymer 4

Polymerization was conducted in a similar manner as in Example 1 except for the use of the comparative polymer 1, which contained no unsaturated bonds, in place of the macromonomer 1. When an aqueous solution of potassium hydroxide was added to the polymerization mixture, the system became significantly clouded and partial precipitation took place. When left over, the system separated into two layers. The polymerization product was measured by GPC. In the visible range, the molecular weight distribution peak of the comparative polymer 1 was observed, and its waveform showed two peaks as a result of overlapping with a molecular weight distribution peak of the copolymer of styrene and 2-hydroxyethyl methacrylate. In the ultraviolet range, on the other hand, it was possible to confirm only peaks ascribable to styrene and 2-hydroxyethyl methacrylate molecules. From the formation of the aqueous solution and also the difference in molecular weight distribution, this comparative example indicates that the comparative polymer 1 reacted with neither styrene nor 2-hydroxyethyl methacrylate and was in the form of a mixture. It is, therefore, indicated that, in each polymer of the present invention which is formed of the macromonomer of Example 1, said macromonomer containing α-substituted methyl acrylate residual groups, and other monomers, the macromonomer has been incorporated in the polymer.

Example 2

Pigment Dispersants 2, 3 and 4

Each pigment dispersant was obtained as will be described hereinafter. The macromonomer 3 or 4 (solution) was charged into a similar reactor as in Polymerization Example 1, followed by heating to 80° C. In a separate vessel, styrene and 2-hydroxyethyl methacrylate were combined at 2/1, and "PERBUTYL O" was mixed at a concentration of 2% based on the monomers to prepare a monomer solution. Into the reactor, the monomer solution was added dropwise over 1 hour at the solid content ratio (X/Y) shown in Table 3. Subsequently, polymerization was conducted at the same temperature for 6 hours. To the polymerization product, triethanolamine or ammonia required to neutralize the acid groups of the polymerization product was added in a form dissolved in water sufficient to give a final solid content of 30%, whereby the polymerization product was formed into an aqueous solution. The results are shown in Table 3.

TABLE 3

|  | Pigment dispersants | | |
|---|---|---|---|
|  | 2 | 3 | 4 |
| Macromonomer (X) | 3 | 4 | 4 |
| Monomers (Y) | X/Y = 4/6 | X/Y = 8/2 | X/Y = 2/8 |
| Neutralizing agent | Triethanolamine | Ammonia | Ammonia |
| External appearance after formation into aqueous solution | Pale, semi-clear | Substantially clear | White, semi-clear emulsion |
| Acid value [mgKOH/g] | 78.8 | 157.6 | 59.1 |
| Number average molecular weight | 11,000 | 6,800 | 15,000 |

These pigment dispersant 2 to pigment dispersant 4 showed similar GPC peaks as the pigment dispersant 1, and were confirmed to have higher molecular weights commensurate with the used amounts of the monomers. The foregoing suggests that these pigment dispersants 2 to 4 each have a block or T-shaped branched structure.

Comparative Example 4

Synthesis of Comparative Polymer 5

Using a similar reactor as in Polymerization Example 1, synthesis was conducted in a similar manner as in Polymerization Example 1 except for the use of the comparative polymer 3 (solution) in place of the macromonomer 1 (solution). In the synthesis, the weight ratio of the comparative polymer 3 to the polymer of styrene and 2-hydroxyethyl methacrylate was 6/4. Upon addition of an aqueous solution of potassium hydroxide, a pale, clear, aqueous solution was obtained. Different from Comparative Example 3, no precipitation took place and the aqueous solution was obtained. It was, therefore, suggested that the comparative polymer 3 was incorporated in the polymer of styrene and 2-hydroxyethyl methacrylate. As a result of measurement of the synthesis product by GPC, a mixture showing two peaks was confirmed, one of said two peaks being ascribable to the comparative polymer 3 and the other to a polymer of the comparative polymer 3, styrene and 2-hydroxyethyl methacrylate. It was, therefore, found that, although a portion of the comparative polymer 3 was incorporated in and polymerized with styrene and 2-hydroxyethyl methacrylate, the remaining portion of the comparative polymer 3 still existed unreacted.

In the pigment dispersant according to the present invention, on the other hand, all the components were indicated to have contributed to the reaction. It has been found that the polymerization process of the above-described examples is excellent for obtaining the pigment dispersant and resin dispersion according to the present invention.

Example 3

Pigment Dispersants 5 and 6

Into a similar reactor as in Polymerization Example 1, the macromonomer 5 (solution) (200 parts) was charged, followed by heating to 82° C. In a separate vessel, vinyltoluene (45 parts), dimethylaminoethyl methacrylate (5 parts) and "PERBUTYL O" (1 parts) were mixed to prepare a monomer solution. The monomer solution was added dropwise to the reactor over 1 hour, and at the same temperature, polymerization was then conducted for 6 hours. When a solution of potassium hydroxide (9.8 parts) in water (40.2 parts) was added to the polymerization mixture, no precipitation took place, and a pale, slightly-turbid, clear, aqueous solution was obtained. The polymer obtained as described above was a pigment dispersant, in which the weight ratio of the macromonomer to the monomers was 50/50 and the acid value was 98.5 mgKOH/g. As a result of measurement of its molecular weight, peak profiles or the like were similar to those described above and the number average molecular weight was 5,500. There was no smell of residual monomer. Its solid content was determined to be 32.5%. Substantially all the monomers were, therefore, confirmed to be polymerized. This polymer will hereinafter be referred to as "the pigment dispersant 5". When a portion of the pigment dispersant 5 was diluted 10-fold with water, a pale, slightly-turbid, clear, aqueous solution was also obtained.

Polymerization was conducted in a similar manner as described above except for the use of the macromonomer 12 (solution) in place of the macromonomer 5 (solution). Despite its polyfunctionality, this macromonomer 12 can be polymerized without gelling in the reaction system. The macromonomer 12 was a highly-branched pigment dispersant, in which the weight ratio of the macromonomer to the monomers was 50/50 and the acid value was 98.5 mgKOH/g. As the macromonomer 12 does not gel, it is indicated that macromonomer 12 is useful in the present invention and can provide a branched pigment dispersant. As a result of measurement of its molecular weight, peak profiles or the like were similar to those described above, and the number average molecular weight was 12,300. There was no smell of residual monomer. Its solid content was determined to be 31.9%. Substantially all the monomers were, therefore, confirmed to be polymerized. This polymer will hereinafter be referred to as "the pigment dispersant 6". When a portion of the pigment dispersant 6 was diluted 10-fold with water, a pale, slightly-turbid, clear, aqueous solution was also obtained.

Example 4

Resin Dispersions 1 and 2

Into a similar reactor as in Polymerization Example 1, the macromonomer 2 (solid, 40 parts), water (240.7 parts) and aqueous ammonia (9.3 parts) were charged. The contents were heated to 78° C. to dissolve the macromonomer 2. After potassium persulfate (0.5 parts) was added to and dissolved in the reaction system, a mixture of styrene (30 parts) and butyl acrylate (30 parts) was added dropwise over 1 hour. Subsequently, polymerization was conducted at the same temperature for 3 hours. The reaction system became clouded, and turned into a yellowish, white, semi-clear dispersion. As a result of measurement of its molecular weight, its number average molecular weight was found to be 26,000. This dispersion will hereinafter be referred to as "the resin dispersion 1". The above-described procedure was repeated likewise except for the use of the macromonomer 6 (solid) in place of the macromonomer 2. As a result, an emulsion-like dispersion was obtained with a color whiter than the resin dispersion 1. As a result of measurement of the polymerization product for its molecular weight, the peak profile contained a single peak, and the number average molecular weight was found to be 32,500. This dispersion will hereinafter be referred to as "the resin dispersion 2".

Comparative Example 5

Synthesis of Comparative Polymer 6

Using a similar reactor as in Polymerization Example 1, synthesis was conducted in a similar manner as in Example 4 except for the use of the comparative polymer 2 in place of the macromonomer 2. As in Example 4, the reaction system became clouded so that a pale semi-clear dispersion was obtained. As a result of measurement of the polymerization product for its molecular weight, a combined peak ascribable to the comparative polymer 2 and a polymer of styrene and butyl acrylate was observed. The number average molecular weight was 31,000. This polymerization product will hereinafter be referred to as "the comparative polymer 6".

The resin dispersions 1 and 2 and the comparative polymer 6 were separately diluted 2-fold with water, and to the resulting dilutions, isopropyl alcohol (IPA) was added little by little under stirring, respectively. In the case of the comparative polymer 6, the resin began progressively precipitate, thereby indicating that the resin had poor solvent dilutability. In the case of each of the resin dispersions 1 and 2, on the other hand, the resin did not undergo precipitation and remained stable even when diluted with IPA. It is presumed that in the case of the comparative polymer 6, the comparative polymer 2 which acted as a protective colloid for the comparative polymer 6 was not bound to the polymer of styrene and butyl acrylate and was in a dissolved state in water, and upon addition of IPA, was caused to precipitate.

Example 5

Pigment Dispersants 7, 8, 9, 10 and 11

Each pigment dispersant was obtained as will be described hereinafter. In a similar reactor as in Polymerization Example 1, additional solvent was added to the corresponding one of the macromonomers 7 to 10 and 13 (solutions) to give a solid content of 40%. After a mixture of the corresponding monomers and an initiator, "PERBUTYL O", (2% based on the monomers) was added dropwise, polymerization was conducted at 78° C. or 90° C. for a predetermined time. In this manner, oily pigment dispersants 7, 8, 9, 10 and 11 were obtained. The results are shown together in Table 4. It is to be noted that each X/Y in the table indicates the weight ratio of the macromonomer to the monomers.

TABLE 4

| | | Pigment dispersants | | | | |
|---|---|---|---|---|---|---|
| | | 7 | 8 | 9 | 10 | 11 |
| Macromonomers | | 7 | 8 | 9 | 10 | 13 |
| X/Y | | 6/4 | 4/6 | 6/4 | 8/2 | 4/6 |
| Polymerization temperature | | 78° C. | 78° C. | 90° C. | 90° C. | 90° C. |
| Additional solvent | | PGMAc | PGM | PGM | PGM | PGM |
| Monomer | St | 15 | 30 | 35 | 55 | 55 |
| composition | VT | 40 | — | — | — | — |
| (parts) | VN | — | 10 | — | — | — |
| | DMAEMA | 25 | — | 5 | — | — |
| | BTMAEMA | — | — | 30 | 35 | 35 |
| | MMA | 20 | — | — | — | — |
| | DMPSAA | — | 20 | — | — | — |
| | 2EHMA | — | — | 30 | — | — |
| | HEMA | — | — | — | 10 | — |
| Number average molecular weight | | 9,200 | 13,600 | 9,000 | 7,750 | 18,200 |

PGMAc: Propylene glycol monomethyl ether acetate, PGM: Propylene glycol monomethyl ether, St: Styrene, VT: Vinyltoluene, VN: Vinylnaphthalene, DMAEMA: Dimethylaminoethyl methacrylate, BTMAEMA: Benzyl trimethylammonium ethyl chloride methacrylate, MMA: Methyl methacrylate, DMPSAA: Dimethylpropylsulfonic acid acrylamide, 2EHMA: 2-Ethylhexyl methacrylate, HEMA: 2-Hydroxyethyl methacrylate Polymerization Example 6

Synthesis of Resin Dispersion 3

Into a similar reactor as in Polymerization Example 1, "ISOPAR G" (100 parts) and the macromonomer 11 (solution) (100 parts) were charged, followed by heating to 80° C. In a separate vessel, styrene (40 parts), vinyl acetate (35 parts), N-vinylpyrrolidone (15 parts) and azobisisobutyronitrile (1.5 parts) were mixed to prepare a monomer mixture. The monomer mixture was added dropwise to the reactor over 2 hours. Subsequent to the dropwise addition, azobisisobutyronitrile (0.5 parts) was added further, followed by polymerization for 4 hours. A clouded, non-aqueous resin dispersion 3 was obtained. The polymerization product was found to have a number average molecular weight of 31,200 by GPC. The peak ascribable to the macromonomer 11 was not observed.

Application Example 1

Application to Inkjet Inks

Water was added to the pigment dispersant 1 of Example 1 to afford an aqueous dispersion having a resin content of 300. The aqueous dispersion (150 parts), ethylene glycol (40 parts) and purified water (160 parts) were mixed thoroughly. With the resulting mixture, a black pigment "Raven 2500 Powder (U)" (product of Columbia Carbon Co., Ltd.; 150 parts) was mixed under stirring to prepare a mill base. After the mill base was thoroughly dispersed by using a medium-containing, horizontal disperser, purified water (250 parts) was added to the mill base to afford a pigment dispersion of 20% pigment content. To the dispersion (100 parts), ethylene glycol (51.0 parts), glycerin (33.0 parts), polyoxyethylene oleate (1 parts), a surfactant (0.8 parts), an aqueous dispersion (15 parts) of the pigment dispersant 1 the concentration of which had been adjusted to 40%, and purified water (197 parts) were added. The resulting mixture was stirred, and was then subjected to centrifugal separation (8,000 rpm, 20 minutes) to remove coarse particles. Subsequently, filtration was conducted with a membrane filter of 5 μm to afford a black inkjet ink.

With respect to yellow, cyan and magenta colors, similar operations were conducted to afford yellow inkjet ink, cyan inkjet ink and magenta inkjet ink. "SEIKA FAST YELLOW A3" (product of Dainichiseika Color & Chemicals Mfg. Co., Ltd.) was used as a yellow pigment, "CYANINE BLUE KBM" (product of Dainichiseika Color & Chemicals Mfg. Co., Ltd.) as a blue pigment, and "CHROMOFINE MAGENTA 6887" (product of Dainichiseika Color & Chemicals Mfg. Co., Ltd.) as a magenta pigment. The inkjet inks obtained as described above were separately filled in ink cartridges, and by an inkjet printer, solid printing was performed on glossy inkjet paper, "PHOTOLIKE QP" (product of KONICA CORPORATION). After the respective prints were left over for 1 day in a room, their optical densities were measured by using "MACBETH RD-919" (manufactured by Macbeth AG), their chromas were measured by using a chromatic meter ("CR-321", manufactured by Minolta Camera Co., Ltd.), and their 20-deg. glosses were measured by using "MICRO-TRI-GLOSS" (manufactured by BYK-Chemie GmbH). Further, vertical and horizontal lines were printed. The resultant prints were visually observed for print definition to rank their print quality. In addition, as scratch resistances of prints on glossy paper, the printed surfaces were finger-rubbed to determine whether or not a reduction took place in gloss. The results are shown together in Table 5.

TABLE 5

| | Inkjet inks of Application Example 1 | | | |
|---|---|---|---|---|
| | Cyan | Magenta | Yellow | Black |
| Print quality | | | | |
| Optical density of print on glossy paper (100%) | 1.35 Excellent | 1.36 Excellent | 1.47 Excellent | 1.42 Excellent |
| Print definition | A | A | A | A |
| 20-Deg. gloss of print on glossy paper | 49 Excellent | 51 Excellent | 48 Excellent | 40 Excellent |
| Scratch resistance on glossy paper | Good | Good | Excellent | Good |

Ranking in print definition - A: No misalignment, B: Substantially no misalignment, C: Misaligned.

The prints of the inkjet inks obtained from the pigment dispersant 1 as described above each showed a very high gloss and a very large chroma. Similar advantageous effects were also obtained when the pigment dispersants 3, 5, 6 and 7 were individually used in place of the pigment dispersant 1.

Application Example 2

Application to Stationery

The pigment dispersant 1 was diluted into a 40% solution with water. To the solution (50 parts), morpholine (30 parts), ethylene glycol (50 parts), disodium ethylenediaminetetraacetate (30 parts) and a phthalocyanine pigment paste (265 parts; pigment content: 90 parts) were added. The resulting mixture was dispersed for 3 hours in a sand mill. Water (308 parts), ethylene glycol (131 parts), glycerin (36 parts) and thiourea (100 parts) were then added to lower the concentration of the pigment to 9%. The resulting mixture was then dispersed for 10 minutes to afford an aqueous pigment dispersion of a blue color. The dispersion was then processed by an ultracentrifuge to remove undispersed coarse particles, thereby obtaining an aqueous pigment dispersion having a pigment content of 8.7%, a viscosity of 4.3 mPas and an average particle size of 98 nm.

The dispersion was filled in a plastic-made felt-tip pen which was equipped with a felt core and a pen point made by molding of plastics, and was then tested. Using the felt-tip pen, characters were written on a polyethylene-made film. Smooth and clear writing was feasible without ink repellency while exhibiting sufficient hiding power and large tinting power. The written characters were immersed in water, but underwent neither running nor separation. The written film was subjected to a light fastness test for 100 hours and 500 hours under a fadeometer. As a result, no particular change was observed so that good light fastness was demonstrated. Further, the pigment dispersion was left over for 1 month in a constant-temperature chamber controlled at 50° C. to perform a storage stability test. Neither a viscosity increase/decrease nor a particle size increase took place. The pigment dispersion was, therefore, found to have very good storage stability. Similar advantageous effects were also observed when the pigment dispersants 2, 3, 4 and 5 were individually used in place of the pigment dispersant 1.

Application Example 3

Application to Water-based Paint

The pigment dispersant 4 (400 parts), water (300 parts) and cyanine blue (300 parts) were charged in a ceramic ball mill, and then dispersed for 24 hours to afford a pigment dispersion for water-based paints. "WATERSOL S-126" (100 parts), "WATERSOL S-695" (5 parts), "WATERSOL S-683IM" (5 parts) and water (100 parts) were then added, followed by stirring. The above-described dispersion (30 parts) was added further, and the thus-obtained mixture was stirred to obtain a paint 1. The paint 1 was applied onto an aluminum plate and baked at 140° C. for 20 minutes. As a result, a beautiful, transparent, blue coating was formed. The painted plate was immersed for 30 minutes in boiling water, but its coating did not develop whitening, blistering or separation. The color development and gloss of the coating were good. Similar advantageous effects were also obtained when the pigment dispersions 3 and 5 were individually used in place of the pigment dispersion 4.

Application Example 4

Application to Water-based Gravure Ink

A white pigment base color was prepared by kneading and dispersing twice in a sand mill a mixture consisting of titanium oxide white pigment (40 parts), a styrene-monobutyl maleate (40:60) copolymer (average molecular weight: approx. 3,500, 10 parts), isopropyl alcohol (10 parts), water (38.5 parts), the pigment dispersant 3 (1 part) and a silicone-based defoaming agent (0.5 part). To the white pigment base color (50 parts), the resin dispersion 1 (solid content: 40%; 30 parts), fine particulate silicic anhydride (0.5 part), polyethylene wax (0.5 part), a silicone-based defoaming agent (0.1 part), an oxazoline crosslinking agent (solid content: 30%; 3 parts), and water (8.9 parts) were added. After the resulting mixture was mixed into a homogeneous mixture by a sand mill, the mixture was adjusted to pH 8 with aqueous ammonia. A nylon film of 20 μm thickness was subjected to corona discharge treatment, onto which the white printing ink obtained as described above was applied with a No. 4 bar coater. Subsequent to drying, the print was allowed to age at 80° C. for 1 hour. Using a cellophane tape, the printed ink layer was subjected to an adhesion strength test. As a result, good adhesiveness was exhibited.

Application Example 5

Application to Color Filters

Provided were an acrylic resin varnish (which had been obtained by copolymerizing benzyl methacrylate, methacrylic acid, 2-hydroxyethyl methacrylate at a molar ratio of 70/15/15; molecular weight: 12,000, acid value: 100 mgKOH/g, solid content: 40%) (50 parts); and as color filter pigments, PR (C.I. Pigment Red) 254, PG (C.I. Pigment Green) 36, PY(C.I. Pigment Yellow) 139, PY150, PB (C.I. Pigment Blue) 15:6 and PV (C.I. Pigment Violet) 23. Base colors of respective colors for color resists were each prepared as will be described hereinafter. One of the above-described pigments (15 parts), the pigment dispersant 8 (11.5 parts) and a solvent (propylene glycol monomethyl ether acetate) (hereinafter abbreviated as "PMA") (25 parts) were combined. Subsequent to premixing, they were dispersed in a horizontal bead mill. The thus-obtained pigment dispersions of the respective colors were measured to determine the average particle sizes of their pigments. As a result, it was found that the average particle sizes approximately ranged from 25 to 50 nm and the finely-divided pigments were sufficiently microdispersed. During storage, viscosity variations were within ±5% even when left over at 45° C. for 1 week. The pigment dispersant according to the present invention, therefore, showed good pigment dispersibility. To fabricate an RGB color filter, photosensitive pigment dispersions of R (red), G (green) and B (blue) colors were prepared in accordance with the formulas shown below in Table 6.

TABLE 6

| Formula (parts) | Photosensitive pigment dispersions | | |
|---|---|---|---|
| | Red | Green | Blue |
| Red base color | 100 | — | — |
| Green base color | — | 100 | — |
| Blue base color | — | — | 100 |
| Acrylic resin varnish | 50 | 50 | 50 |
| Trimethylolpropane triacrylate | 10 | 10 | 10 |
| 2-Hydroxy-2-methylpropiophenone | 2 | 2 | 2 |
| 2,2-Diethoxyacetophenone | 1 | 1 | 1 |
| PMA | 37 | 37 | 37 |
| Total | 200 | 200 | 200 |

A glass substrate which had been subjected to treatment with a silane coupling agent was placed on a spin coater. The photosensitive pigment dispersion of R color for the color filter was spin-coated under conditions of firstly 300 rpm and 5 seconds and then 1,200 rpm and 5 seconds. Prebaking was then conducted at 80° C. for 10 minutes, a photomask with a mosaic pattern defined therein was brought into close contact with the resultant prebaked film, and by using an ultra-high pressure mercury vapor lamp, exposure was then conducted at a light quantity of 100 mJ/cm$^2$. Development and washing were then conducted with a dedicated developer and a dedicated rinse to form a red mosaic pattern on the glass substrate.

Following the above-described procedures, coating and baking were conducted with the photosensitive pigment dispersions of the G and B colors for the color filter to obtain an RGB color filter. The thus-obtained color filter had superb spectral curve characteristics, and was excellent in fastness such as light fastness and heat resistance and also in light transmittance characteristics, and exhibited excellent properties as a color filter for a liquid-crystal color display. Similar high pigment dispersibility was also exhibited when the pigments 9 to 11 were used likewise.

Application Example 6

Application to Wet Toner

The pigment dispersant 8 (5 parts) was added to and dissolved in "ISOPAR H" (40 parts) which is an aliphatic hydrocarbon solvent. To the solution, a phthalocyanine blue pigment (10 parts) were added. After addition of glass beads, the mixture was shaken for 20 hours on a paint shaker to effect dispersion. The resin dispersion 3 (53.3 parts) was then added, followed by mixing under stirring to prepare a thick coloring solution of a blue color. The thick coloring solution (30 parts) was added to and dispersed in "ISOPAR G" (970 parts) to obtain a wet electrophotographic developer of a cyan color. The thick coloring solution and wet electrophotographic developer obtained as described above were excellent in dispersion stability, and even in diluted forms, the pigment did not precipitate much and moreover, it was possible to easily redisperse the precipitated small portions of the pigment. Using the wet electrophotographic developer of the cyan color obtained as described above, copying was performed by a wet electrophotographic copying machine. As a result, cyan copy images were obtained with high image density and sharpness without much bleeding or scumming. Those images also showed excellent durability in various physical properties such as light fastness.

INDUSTRIAL APPLICABILITY

The dispersion of a pigment with the copolymer of the present invention as a pigment dispersant makes it possible to obtain a highly-microdispersed pigment dispersion that can bring about very good dispersing effects and can also provide a resulting dispersion with excellent storage stability. In addition, the use of the copolymer of the present invention for the formation of a film can provide the resulting film with good properties.

The invention claimed is:

1. A copolymer (D) comprising (A) methacrylic polymer units each having, at an end thereof, at least one group represented by the below-described formula (1) and (B) units of an aromatic vinyl monomer, wherein a weight ratio (A:B) of the units (A) to the units (B) is A:B=5 to 95:95 to 5.

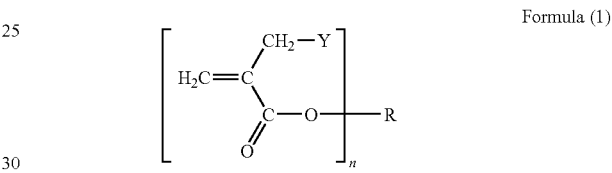

Formula (1)

wherein R represents a hydrogen atom or an n-valent ester residual group, n stands for a number of from 1 to 4, and Y represents a methacrylic polymer.

2. The copolymer (D) according to claim 1, further comprising (C) units of a monomer other than a monomer or monomers forming the units (A) or the monomer forming the units (B).

3. The copolymer (D) according to claim 1, wherein the units (A) comprise a copolymer of a compound represented by the below-described formula (2) and a methacrylic monomer:

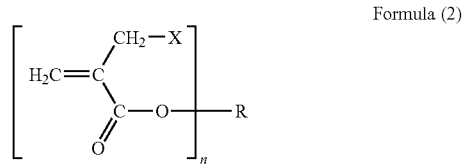

Formula (2)

wherein X represents a halogen atom, alkylthio group, arylthio group, alkylsulfoxide group, arylsulfoxide group, benzyloxy group or alkylbenzyloxy group, R represents a hydrogen atom or an n-valent ester residual group, and n stands for a number of from 1 to 4.

4. The copolymer (D) according to claim 1, wherein the monomer forming the units (B) is at least one of styrene, α-methylstyrene, vinyltoluene, vinyldimethylbenzene, vinylethylbenzene, and vinylnaphthalene.

5. The copolymer (D) according to claim 2, wherein the monomer forming the units (C) is a monomer having a group selected from the group consisting of a carboxyl group, a hydroxyl group, a sulfonic group, a phosphoric group, an amino group, a quaternary ammonium group, and nitrogen-containing heterocyclic groups.

6. The copolymer (D) according to claim 1, wherein each unit (A) contains acid groups neutralizable with an alkaline substance and has an acid value of from 50 to 300 mgKOH/g.

7. The copolymer (D) according to claim 6, which is dispersed or emulsified in a liquid medium.

8. The copolymer (D) according to claim 6, wherein the acid groups are carboxyl groups, sulfonic groups and/or phosphoric groups.

9. A pigment dispersant comprising the copolymer (D) according to claim 1.

10. A pigment dispersion comprising a pigment dispersed by the pigment dispersant according to claim 9.

11. A paint, ink, coating formulation or toner comprising, as a colorant, the pigment dispersion according to claim 10.

* * * * *